(12) United States Patent
Okabe

(10) Patent No.: US 9,205,305 B2
(45) Date of Patent: Dec. 8, 2015

(54) GOLF BALL

(75) Inventor: Satoko Okabe, Kobe (JP)

(73) Assignee: DUNLOP SPORTS CO. LTD., Kobe-Shi (JP)

(*) Notice: Subject to any disclaimer, the term of this patent is extended or adjusted under 35 U.S.C. 154(b) by 321 days.

(21) Appl. No.: 13/231,999

(22) Filed: Sep. 14, 2011

(65) Prior Publication Data

US 2012/0094783 A1 Apr. 19, 2012

(30) Foreign Application Priority Data

Oct. 15, 2010 (JP) .................................. 2010-232886

(51) Int. Cl.
| | |
|---|---|
| *A63B 37/00* | (2006.01) |
| *C08L 77/00* | (2006.01) |
| *C08L 77/08* | (2006.01) |
| *C08L 23/08* | (2006.01) |

(52) U.S. Cl.
CPC ......... *A63B 37/0039* (2013.01); *A63B 37/0043* (2013.01); *A63B 37/0048* (2013.01); *A63B 37/0049* (2013.01); *C08L 23/0876* (2013.01); *C08L 77/00* (2013.01); *C08L 77/08* (2013.01)

(58) Field of Classification Search
None
See application file for complete search history.

(56) References Cited

U.S. PATENT DOCUMENTS

| | | | | |
|---|---|---|---|---|
| 3,849,162 | A * | 11/1974 | Mueller et al. ................ | 427/158 |
| 4,062,819 | A * | 12/1977 | Mains et al. ............... | 525/420.5 |
| 6,800,690 | B2 * | 10/2004 | Rajagopalan et al. ........ | 525/183 |
| 2009/0270203 | A1 | 10/2009 | Okabe | |
| 2010/0160517 | A1 | 6/2010 | Iizuka et al. | |
| 2010/0167842 | A1 * | 7/2010 | Okabe .......................... | 473/373 |

FOREIGN PATENT DOCUMENTS

| | | |
|---|---|---|
| JP | 2009-132767 A | 6/2009 |
| JP | 2009-261791 A | 11/2009 |
| JP | 2009-261792 A | 11/2009 |
| JP | 2010-17414 A | 1/2010 |
| JP | 2010-142644 A | 7/2010 |
| JP | 2010-154969 A | 7/2010 |
| JP | 2010-154970 A | 7/2010 |

OTHER PUBLICATIONS

English Translation of Japanese Office Action dated Jan. 7, 2014 for Application No. 2010-232886.

* cited by examiner

*Primary Examiner* — David Buttner
(74) *Attorney, Agent, or Firm* — Birch, Stewart, Kolasch & Birch, LLP

(57) ABSTRACT

The present invention provides a golf ball having a center and at least one intermediate layer covering the center and a cover, wherein at least one of the intermediate layer is formed from a composition comprising, as a resin component, (A) a polyamide copolymer containing (a-1) a polymerized fatty acid, (a-2) sebacic acid and/or azelaic acid, (a-3) a polyamine component as an essential component, and (B) at least one member selected from (b-1) a binary copolymer composed of an olefin and an α,β-unsaturated carboxylic acid, (b-2) a metal ion-neutralized product of a binary copolymer composed of an olefin and an α,β-unsaturated carboxylic acid, (b-3) a ternary copolymer composed of an olefin, an α,β-unsaturated carboxylic acid and an α,β-unsaturated carboxylic acid ester, and (b-4) a metal ion-neutralized product of a ternary copolymer composed of an olefin, an α,β-unsaturated carboxylic acid and an α,β-unsaturated carboxylic acid ester.

18 Claims, No Drawings

GOLF BALL

FIELD OF THE INVENTION

The present invention relates to a golf ball traveling a great distance on long iron shots.

DESCRIPTION OF THE RELATED ART

In three-piece golf balls or multi-piece golf balls, golf balls employing an intermediate layer with a high rigidity or high elasticity have been proposed.

Japanese Patent Publication No. 2010-17414 A discloses a golf ball comprising: a core consisting of a center and one or more intermediate layers covering the center, and a cover covering the core, wherein at least one piece or one layer of said intermediate layers is formed from a highly elastic intermediate layer composition that contains (A) a highly elastic polyamide resin having a flexural modulus in a range from 700 MPa to 5000 MPa, (B) a metal-ion neutralized product of an ethylene-(meth)acrylic acid copolymer and (C) a resin having a polar functional group, wherein an amount ratio (the total is 100 mass %) of (A) the highly elastic polyamide resin to (B) the metal-ion neutralized product of the ethylene-(meth)acrylic acid copolymer is (20 mass % to 80 mass %)/(80 mass % to 20 mass %), and the content of (C) the resin having a polar functional group is 0.1 part by mass to 20 parts by mass with respect to 100 parts by mass of a total of (A) the polyamide resin and (B) the metal-ion neutralized product of the ethylene-(meth)acrylic acid copolymer.

Japanese Patent Publication No. 2009-261791 A discloses a golf ball comprising: a core consisting of a center and one or more intermediate layers covering the center, and a cover covering the core, wherein at least one piece or one layer of said intermediate layers is formed from a highly elastic intermediate layer composition that contains (A) a highly elastic resin having a flexural modulus in a range from 700 MPa to 5000 MPa and (B) an ionomer resin having a flexural modulus in a range from 150 MPa to 1000 MPa in an amount ratio ((A)/(B)) of (A) the highly elastic resin to (B) the ionomer resin being (20 mass % to 80 mass %)/(80 mass % to 20 mass %) (the total is 100 mass %).

Japanese Patent Publication No. 2009-261792 A discloses a golf ball comprising: a core consisting of a center and one or more intermediate layers covering the center, and a cover covering the core, wherein at least one piece or one layer of said intermediate layers is formed from a high rigidity intermediate layer composition that contains (a) ethylene-(meth)acrylic acid copolymer or a metal-ion neutralized product thereof, (b) a copolymer of an α-olefin and glycidyl (meth)acrylate or unsaturated glycidyl ether, (c) a polyolefin and (d) an ionomer resin neutralized with a metal which is different from the metal of (a) the metal-neutralized product of the ethylene-(meth)acrylic acid copolymer, wherein a mass ratio ((a+b+c)/d) of a total of (a) the ethylene-(meth)acrylic acid copolymer or the metal-ion neutralized product thereof and (b) the copolymer of the α-olefin and glycidyl (meth)acrylate or unsaturated glycidyl ether, (c) the polyolefin to (d) the ionomer resin neutralized with the metal which is different from the metal of (a) the metal-neutralized product of ethylene-(meth)acrylic acid copolymer is 95 parts by mass/5 parts by mass to 50 parts by mass/50 parts by mass.

SUMMARY OF THE INVENTION

One of the great requirements for golf ball is a greater flight distance. There have been many proposals about golf balls traveling a great flight distance on driver shots, but there haven't been a lot of proposals about golf balls traveling a great flight distance on long iron shots. Since not a few golfers are bad at long irons, clubs for a long flight distance such as an utility club or fairway wood are used in place of long irons, in many cases.

As a method to improve a flight distance of a golf ball, a method of employing an intermediate layer with a high rigidity or high elasticity is known. However, there remain the following problems. For example, in a method of mixing a thermoplastic resin having a high rigidity with the ionomer resin to impart the high rigidity to the intermediate layer, the intermediate layer composition has a low fluidity. If the intermediate layer composition has a low fluidity, since it is impossible to make the intermediate layer thinner, the center formed from the rubber composition having a high resilience must be made to have a smaller diameter, resulting in a shorter flight distance of the golf balls. A method to add an fluidity improving agents such as a fatty acid or a metal salt thereof, and a polymer material having a low melting point into the intermediate layer composition has been studied, but it is necessary to add the fluidity improving agents in a considerable amount in order to ensure the fluidity. Thus, a problem of lowering the rigidity of the intermediate layer arises.

The present invention has been achieved in view of the above circumstances. An object of the present invention is to provide a golf ball traveling a long flight distance on long iron shots.

The present invention provides a golf ball comprising a core consisting of a center and at least one intermediate layer covering the center and a cover covering the core, wherein at least one of the intermediate layer is formed from an intermediate layer composition comprising, as a resin component, (A) a polyamide copolymer containing (a-1) a polymerized fatty acid, (a-2) sebacic acid and/or azelaic acid, (a-3) a polyamine component as an essential component, and (B) at least one member selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester.

(A) The polyamide copolymer containing (a-1) a polymerized fatty acid, (a-2) sebacic acid and/or azelaic acid, (a-3) a polyamine component as an essential component used in the present invention has high elasticity irrespective of having high fluidity. Use of (A) component provides the intermediate layer composition with a high elasticity and fluidity. Use of this intermediate layer composition provides a core having a high resilience with an outer hard-inner soft structure, and further provides a golf ball traveling a great flight distance.

According to the present invention, the golf ball traveling a great flight distance on long iron shots is obtained.

DESCRIPTION OF THE PREFERRED EMBODIMENT

The present invention provides a golf ball comprising a core consisting of a center and at least one intermediate layer covering the center and a cover covering the core, wherein at least one of the intermediate layer is formed from an intermediate layer composition comprising, as a resin component, (A) a polyamide copolymer containing (a-1) a polymerized fatty acid, (a-2) sebacic acid and/or azelaic acid, (a-3) a polyamine component as an essential component, and (B) at least one member selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester.

First, "(A) a polyamide copolymer containing (a-1) a polymerized fatty acid, (a-2) sebacic acid and/or azelaic acid, (a-3) a polyamine component as an essential component" will be explained. The polyamide copolymer is not limited, as long as it is a polymer having an amide bond as a repeating unit in a molecular chain, and it is obtained by copolymerizing (a-1) the polymerized fatty acid, (a-2) sebacic acid and/or azelaic acid, (a-3) the polyamine component as an essential component.

The polyamide copolymer includes a polyamide resin and a polyamide elastomer. The polyamide resin consists of the polyamide component obtained by copolymerizing (a-1) the polymerized fatty acid, (a-2) sebacic acid and/or azelaic acid and (a-3) the polyamine component as an essential component, whereas the polyamide elastomer has a hard segment part composed of the polyamide component and a soft segment part composed of a polyetherester component or a polyether component. The polyamide elastomer for use in the present invention includes a polyetherester polyamide obtained by a reaction between a polyamide component essentially composed of (a-1) a polymerized fatty acid, (a-2) sebacic acid and/or azelaic acid, and (a-3) a polyamine component and a polyetherester component consisting of (a-4) polyoxyalkyleneglycol and (a-5) a dicarboxylic acid; and a polyether polyamide obtained by a reaction between a polyamide component essentially composed of (a-1) a polymerized fatty acid, (a-2) sebacic acid and/or azelaic acid, and (a-3) a polyamine component and a polyether made up of a polyoxyalkylene glycol which are aminated or carboxylated at both terminals thereof and a dicarboxylic acid or a diamine.

(a-1) The polymerized fatty acid preferably includes the polymerized fatty acid having 20 to 48 carbon atoms, more preferably the polymerized fatty acid that is obtained by a polymerization of an unsaturated fatty acid like a monobasic fatty acid having 10 to 24 carbon atoms with at least one double or triple bond. Specific examples include dimers of oleic acid, linoleic acid, erucic acid or the like.

The commercial polymerized fatty acid conventionally contains a dimer fatty acid as a primary component, with the fatty acid of a raw material and a tirmer fatty acid. In the present invention, preferred is the polymerized fatty acid having 70 mass % or more of the dimer fatty acid, more preferably 95 mass % or more of the dimer fatty acid, with a lowered unsaturation degree by hydrogenation. For example, the commercial products such as PRIPOL 1009, PRIPOL 1004 (available from Unichema), and EMPOL 1010 (available from HENKEL) are preferable. The mixture of these products is also preferable.

The polybasic acid used in combination with the polymerized fatty acid are (a-2) azelaic acid, sebacic acid, or a mixture thereof, from the view points of the reactivity of polymerization, the ability of copolymerization with the polymerized fatty acid, and the properties of the obtained polyamide copolymer.

(a-3) The polyamine component preferably includes diamine having 2 to 20 carbon atoms. Specific examples of the polyamine components include diamines such as ethylenediamine, 1,4-diaminobutane, hexamethylenediamine, nonamethylenediamine, undecamethylenediamine, dodecamethylenediamine, 2,2,4-trimethylhexamethylenediamine, bis-(4,4'-aminocyclohexyl)methane, metaxylylenediamine.

(a-4) The polyalkyleneglycol component constituting the polyamide elastomer includes, for example, polyoxyethyleneglycol, polyoxypropyleneglycol, polyoxytetramethyleneglycol, a block or random copolymer composed of ethylene oxide and propylene oxide, a block or random copolymer composed of ethylene oxide and tetrahydrofuran, or these copolymers which are aminated or carboxylated at the both terminals thereof. These polyalkyleneglycols preferably have a number average molecular weight ranging from 200 to 3,000.

(a-5) The dicarboxylic acid component constituting the polyamide elastomer preferably includes dicarboxylic acid having 6 to 20 carbon atoms. Specific examples include aliphatic dicarboxylic acids such as adipic acid, azelaic acid, sebacic acid, dodecane dicarboxylic acid or the like; aromatic dicarboxylic acids such as terephthalic acid, isophthalic acid; and alicyclic dicarboxylic acids like 1,4-cyclohexane dicarboxylic acid. In particular, adipic acid, azelaic acid, sebacic acid, dodecane dicarboxylic acid, terephtalic acid, and isophtalic acid are preferable in view of polymerization reactivity and properties of the polyamide elastomer.

In a method for producing the polyamide copolymer used in the present invention, three components of (a-1) the polymerized fatty acid, (a-2) azelaic acid and/or sebacic acid, and (a-3) the polyamine component are preferably mixed and polycondensed under the conditions that a mass ratio (a-1)/(a-2) of (a-1) component to (a-2) component ranges from 0.25 to 5.2, and whole amino groups are substantially equivalent to whole carboxyl groups. If the mass ratio (a-1)/(a-2) falls within the range from 0.25 to 5.2, the polyamide copolymer having same plasticity as nylon 12 or external plasticized nylon 12 is obtained. If the mass ratio (a-1)/(a-2) is less than 0.25, the obtained polyamide copolymer may have insufficient plasticity, while if the mass ratio (a-1)/(a-2) is more than 5.2, the obtained polyamide copolymer tends to become too soft and have lower heat resistance. Further, if the melt viscosity of the polyamide copolymer at the temperature of 250° C. is less than 5 Pa·s, the mechanical properties become too low. Thus, the melt viscosity of the polyamide copolymer is preferably 5 Pa·s or more, more preferably ranges from 10 Pa·s to 500 Pa·s.

For example, in the case of polycondensation of three components of (a-1) the polymerized fatty acid, (a-2) azelaic acid and/or sebacic acid, and (a-3) hexamethylenediamine, since a salt of the polymerized fatty acid and hexamethylenediamine and a salt of azelaic acid and/or sebacic acid and hexamethylenediamine have relatively low melting points and the polymerization rate of these components are relatively high, it is not necessary to add water to promote ring-opening polymerization or carry out homogenous polymerization, unlike a system of caprolactam, polymerized fatty acid and hexamethylenediamine, and a system of adipic acid, polymerized fatty acid and hexamethylene diamine. Thus, it is not necessary to use a pressure reaction vessel. Further, it is not necessary to adopt a complicated two-step polymerization where the prepolymer is prepared from adipic acid and hexamethylenediamine, and the polymerized fatty acid and hexamethylenediamine are polycondensed.

In a preferable embodiment, into the sufficiently nitrogen purged reaction vessel, three components of (a-1) the polymerized fatty acid, (a-2) azelaic acid and/or sebacic acid, and (a-3) hexamethylenediamine are preferably charged so that a mass ratio (a-1)/(a-2) of (a-1) component to (a-2) component ranges from 0.25 to 5.2, and whole amino groups are substantially equivalent to whole carboxyl groups, reacted for 1 to 3 hours at the elevated temperature from 200 to 280° C. in the presence of a predetermined amount of a molecular weight adjusting agent such as stearic acid or the like, and a small amount of polymerization catalyst such as phosphoric acid or the like, further reacted for 0.5 to 2 hours under the reduced pressure as low as about 160 mmHg to give the polyamide copolymer having excellent plasticity with a high molecular weight of the melt viscosity at the temperature of 250° C. being 5 Pa·s or more.

The catalysts used herein, include, for example, phosphoric acid based catalysts such as phosphoric acid, metaphosphoric acid, polyphosphoric acid or the like.

As a method for preparing a polyamide elastomer, any method can be adopted, as long as the homogenous elastomer can be obtained. For example, the polyetherester polyamide is obtained by synthesizing the polyamide oligomer, followed by adding polyoxyalkyleneglyclol and dicarboxylic acid, and heating under the reduced pressure for the polymerization, or can be obtained by charging a polyamide forming monommer and polyoxyalkyleneglycol and dicarboxylic acid at once, followed by being homogneized by heating, and polymerized under the reduced pressure.

(A) The polyamide copolymer used in the present invention may further include additives such as an antioxidant, an anti heat-decomposition agent, an ultraviolet absorber or the like. The thermal stabilizer includes, for example, various hindered phenols or derivative thereof such as 4'4-bis(2,6-di-t-butylphenol), 1,3,5-trimethyl-2,4,6-tris(3,5-di-t-butyl-4-hydroxyl benzyl)benzene, tetrakis[methylene-3(3,5-di-t-butyl-4-hydroxyphenyl)propionate]methane, N,N'-hexamethylene-bis(3,5-di-t-butyl-4-hydroxycinnamic acid amide); aromatic amines such as N,N'-bis((3-naphthyl)-P-phenylenediamine, 4,4'-bis(4-α,α-dimethylbenzyl)diphenylamine, sulfur compounds such as dilauryltiodipropionate or the like; phosphorus compounds; alkaline earth metal oxides; nickel salts of Schiff base; Copper (I) iodide and/or potassium iodide The light stabilizer includes, for example, substituted benzophenone, benzotriazoles, piperizine compounds such as bis(2,2,6,6-tetramethyl-4-piperizine)sebacate or 4-benzoyloxy-2,2,6,6-tetramethylpiperizine.

(A) The polyamide copolymer used in the present invention may further include, a reinforcing agent, filler, lubricant, mold release agent, plasticizer, flame retardant, anti-hydrolysis agent or the like where necessary.

The melt flow rate (230° C., 2.16 kg) of (A) the polyamide copolymer is preferably 10 g/10 min or more, more preferably 20 g/10 min or more, and even more preferably 30 g/10 min or more, and is preferably 2,000 g/10 min or less, more preferably 1,800 g/10 min or less, even more preferably 1,500 g/10 min or less. If the melt flow rate of (A) the polyamide copolymer is 10 g/10 min or more, the intermediate layer composition has better fluidity, and for example, it is easy to mold the thin intermediate layer. If the melt flow rate of (A) the polyamide copolymer is 2,000 g/10 min or less, the durability of the resultant golf ball becomes better.

(A) The polyamide copolymer preferably has a flexural modulus of 400 MPa or more, more preferably 410 MPa or more, even more preferably 420 MPa or more, and preferably has a flexural modulus of 1,000 MPa or less, more preferably 950 MPa or less, even more preferably 900 MPa or less. If the flexural modulus of (A) the polyamide copolymer is too low, the spin rate on long iron shots does not tend to become low, while if the flexural modulus is too high, the spin rate on long iron shots may become excessively low, and the shot feeling also deteriorates.

Specific examples of (A) the polyamide copolymer are PA-30R, PA-40R, PA-50R, PA-30L, PA-40L, PA-50L or the like available from Fujikasei Kogyou Co, Ltd.

Next, (B) component used in the present invention will be explained.

The intermediate layer composition of the present invention includes (B) at least one member selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester. The intermediate layer composition of the present invention preferably contains at least one of (b-1) the binary copolymer and (b-2) the metal ion-neutralized product thereof and at least one of (b-3) the ternary copolymer and (b-4) the metal ion-neutralized product thereof, more preferably (b-2) the metal ion-neutralized product of the binary copolymer and (b-4) the metal ion-neutralized product of the ternary copolymer. (B) component improves the fluidity of the intermediate layer composition.

(b-1) The component is a nonionic binary copolymer of an olefin and an α,β-unsaturated carboxylic acid having 3 to 8 carbon atoms wherein the carboxyl groups thereof are not neutralized. (b-2) The component includes the ionomer resin prepared by neutralizing at least a part of carboxyl groups in a binary copolymer composed of an olefin and an α,β-unsaturated carboxylic acid having 3 to 8 carbon atoms with a metal ion (b-3) The component is a nonionic ternary copolymer of an olefin, an α,β-unsaturated carboxylic acid having 3 to 8 carbon atoms, and an α,β-unsaturated carboxylic acid ester wherein the carboxyl groups thereof are not neutralized. (b-4) The component includes the ionomer resin prepared by neutralizing at least a part of carboxyl groups in a ternary copolymer composed of an olefin, an α,β-unsaturated carboxylic acid having 3 to 8 carbon atoms, and an α,β-unsaturated carboxylic acid ester with a metal ion.

In the present invention, "(b-1) the binary copolymer composed of an olefin and an α,β-unsaturated carboxylic acid having 3 to 8 carbon atoms", is sometimes merely referred to as "binary copolymer," "(b-2) a metal ion-neutralized product of a binary copolymer composed of an olefin and an α,β-unsaturated carboxylic acid having 3 to 8 carbon atoms" is sometimes merely referred to as "binary ionomer resin," "(b-3) a ternary copolymer of an olefin, an α,β-unsaturated carboxylic acid having 3 to 8 carbon atoms, and an α,β-unsaturated carboxylic acid ester" is sometimes merely referred to as "ternary copolymer," and "(b-4) a metal ion-neutralized product of a ternary copolymer composed of olefin, α,β-unsaturated carboxylic acid having 3 to 8 carbon atoms and α,β-unsaturated carboxylic acid ester" is sometimes merely referred to as "ternary ionomer resin."

The olefin preferably includes an olefin having 2 to 8 carbon atoms. Examples of the olefin are ethylene, propylene, butene, pentene, hexene, heptene, and octene. The olefin more preferably includes ethylene. Examples of the α,β-unsaturated carboxylic acid having 3 to 8 carbon atoms are acrylic acid, methacrylic acid, fumaric acid, maleic acid and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable.

(b-1) The binary copolymer preferably includes a binary copolymer composed of ethylene and (meth)acrylic acid, (b-2) the binary ionomer resin preferably includes the metal ion-neutralized product of the binary copolymer composed of ethylene and (meth)acrylic acid. (b-3) The ternary copolymer preferably includes a ternary copolymer composed of ethylene, (meth)acrylic acid, and (meth)acrylic acid ester, and (b-4) the ternary ionomer resin preferably includes the metal ion-neutralized product of the ternary copolymer composed of ethylene-(meth)acrylic acid-(meth)acrylic acid ester. Herein, "(meth)acrylic acid" means acrylic acid and/or methacrylic acid.

The content of the α,β-unsaturated carboxylic acid having 3 to 8 carbon atoms component in (b-1) the binary copolymer or (b-3) the ternary copolymer is preferably 4 mass % or more, more preferably 5 mass % or more, and is preferably 30 mass % or less, more preferably 25 mass % or less.

The melt flow rate (190° C., 2.16 kg) of (b-1) the binary copolymer or (b-3) the ternary copolymer is preferably 5 g/10 min or more, more preferably 10 g/10 min or more, and even more preferably 15 g/10 min or more, and is preferably 1,700 g/10 min or less, more preferably 1,500 g/10 min or less, even more preferably 1,300 g/10 min or less. If the melt flow rate (190° C., 2.16 kg) of (B) (b-1) the binary copolymer or (b-3) the ternary copolymer is 5 g/10 min or more, the intermediate layer composition has better fluidity, and thus it is easier to mold a thin intermediate layer. If the melt flow rate (190° C., 2.16 kg) of (b-1) the binary copolymer or (b-3) the ternary copolymer is 1,700 g/10 min or less, the resultant golf ball has better durability.

Specific examples of (b-1) the binary copolymer include an ethylene-methacrylic acid copolymer such as "NUCREL (registered trademark) (e.g. NUCREL N1050H, NUCREL N2050H, NUCREL AN4318, NUCREL N1110H, NUCREL N0200H) manufactured by Du Pont-Mitsui Polychemicals Co, and an ethylene-acrylic acid copolymer such as "PRIMACORE (registered trademark) 5980I" available from Dow Chemical Company.

Specific examples of the (b-3) ternary copolymer include "NUCREL (registered trademark) (e.g. NUCREL AN4318, NUCREL AN4319) manufactured by Du Pont-Mitsui Polychemicals Co, and "NUCREL (registered trademark) (e.g. NUCREL AE) manufactured by E.I. du Pont de Nemours and Company, and "PRIMACORE (registered trademark) (e.g. PRIMCOR AT310, PRIMCOR AT320) available from Dow Chemical Company. (b-1) The binary copolymer or (b-3) the ternary copolymer can be used alone or in combination of at least two of them.

The content of the α,β-unsaturated carboxylic acid having 3 to 8 carbon atoms in (b-2) the binary ionomer resin is preferably 15 mass % or more, more preferably 16 mass % or more, even more preferably 17 mass % or more, and is preferably 30 mass % or less, more preferably 25 mass % or less. If the content of the α,β-unsaturated carboxylic acid having 3 to 8 carbon atoms is 15 mass % or more, the resultant intermediate layer has a desirable hardness. If the content of the α,β-unsaturated carboxylic acid having 3 to 8 carbon atoms is 30 mass % or less, since the hardness of the resultant intermediate layer does not become excessively high, the durability and shot feeling become better.

The degree of neutralization of the carboxyl groups contained in (b-2) the binary ionomer resin is preferably 15 mole % or more, more preferably 20 mole % or more, and is preferably 90 mole % or less, more preferably 85 mole % or less. If the degree of neutralization is 15 mole % or more, the resultant golf ball has better resilience and durability. If the degree of neutralization is 90 mole % or less, the intermediate layer composition has better fluidity (good moldability). The degree of neutralization of the carboxyl groups in (b-2) the binary ionomer resin can be calculated by the following expression.

Degree of neutralization (mol %) of the binary ionomer resin=(the number of moles of carboxyl groups neutralized in the binary ionomer resin/ the number of moles of all carboxyl groups contained in the binary ionomer resin)×100

Examples of a metal (ion) used for neutralizing at least a part of carboxyl groups of (b-2) the binary ionomer resin include: monovalent metals ions such as sodium, potassium, lithium, or the like; divalent metals ions such as magnesium, calcium, zinc, barium, cadmium, or the like; trivalent metals ions such as aluminum or the like; and other metals (ions) such as tin, zirconium, or the like. As (b-2) the binary ionomer resin used in the present invention, preferably used is a mixture of the binary ionomer resin neutralized with a sodium ion and the binary ionomer resin neutralized with a zinc ion. If the mixture of these ionomers are used, it is easy to strike a balance between the resilience and durability.

Specific examples of (b-2) the binary ionomer resin include trade name "Himilan (registered trademark) (e.g. Himilan 1555 (Na), Himilan 1557 (Zn), Himilan 1605 (Na), Himilan 1706 (Zn), Himilan 1707 (Na), Himilan AM7311 (Mg), Himilan AM7329(Zn))" commercially available from Du Pont-Mitsui Polychemicals Co., Ltd.

Further, examples include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li))" commercially available from E.I. du Pont de Nemours and Company.

Further, examples include "Iotek (registered trademark) (e.g. Iotek 8000 (Na), Iotek 8030 (Na), Iotek 7010 (Zn), Iotek 7030 (Zn))" commercially available from ExxonMobil Chemical Corporation.

(b-2) The binary ionomer resins may be used alone or as a mixture of at least two of them. It is noted that Na, Zn, Li, and Mg described in the parentheses after the trade names indicate metal types of neutralizing metal ions of the binary ionomer resins.

(b-2) The binary ionomer resin preferably has a bending stiffness of 140 MPa or more, more preferably 150 MPa or more, even more preferably 160 MPa or more, and preferably has a bending stiffness of 550 MPa or less, more preferably 500 MPa or less, even more preferably 450 MPa or less. If the bending stiffness of (b-2) the binary ionomer resin is too low, the flight distance tends to be shorter because of the increased spin rate on long iron shots. If the bending stiffness is too high, the durability of the golf ball may be lowered.

The melt flow rate (190° C., 2.16 kg) of (b-2) the binary ionomer resin is preferably 0.1 g/10 min or more, more preferably 0.5 g/10 min or more, and even more preferably 1.0 g/10 min or more, and is preferably 30 g/10 min or less, more preferably 20 g/10 min or less, even more preferably 15 g/10 min or less. If the melt flow rate of (b-2) the binary ionomer resin is 0.1 g/10 min or more, the intermediate layer composition has better fluidity, and for example, it is easy to mold the thin-walled intermediate layer. If the melt flow rate of (b-2) the binary ionomer resin is 30 g/10 min or less, the durability of the resultant golf ball becomes better.

(b-2) The binary ionomer resin preferably has a slab hardness of 50 or more, more preferably 55 or more, even more preferably 60 or more, and preferably has a slab hardness of 75 or less, more preferably 73 or less, even more preferably 70 or less in Shore D hardness. If the binary ionomer resin has a slab hardness of 50 or more in Shore D hardness, the resultant intermediate layer has a high hardness. If the binary ionomer resin has a slab hardness of 75 or less in Shore D hardness, the resultant intermediate layer does not become excessively hard and thus the obtained golf ball has better durability.

The content of the α,β-unsaturated carboxylic acid having 3 to 8 carbon atoms in (b-4) the ternary ionomer resin is preferably 2 mass % or more, more preferably 3 mass % or more, and is preferably 30 mass % or less, more preferably 25 mass % or less.

The degree of neutralization of the carboxyl groups contained in (b-4) the ternary ionomer resin is preferably 20 mole % or more, more preferably 30 mole % or more, and is preferably 90 mole % or less, more preferably 85 mole % or less. If the degree of neutralization is 20 mole % or more, the resultant golf ball obtained by using the intermediate layer composition of the present invention has better resilience and durability. If the degree of neutralization is 90 mole % or less, the intermediate layer composition has better fluidity (good moldability). The degree of neutralization of the carboxyl groups in the ionomer resin can be calculated by the following expression.

Degree of neutralization (mol %) of the ionomer resin=(the number of moles of carboxyl groups neutralized in the ionomer resin/the number of moles of all carboxyl groups contained in the ionomer resin)×100

Examples of a metal (ion) used for neutralizing at least a part of carboxyl groups of (b-4) the ternary ionomer resin include: monovalent metals ions such as sodium, potassium, lithium, or the like; divalent metals ions such as magnesium, calcium, zinc, barium, cadmium, or the like; trivalent metals ions such as aluminum or the like; and other metals (ions) such as tin, zirconium, or the like. (b-4) The ternary ionomer resin used in the present invention is preferably neutralized with zinc. Use of (b-4) the ternary ionomer resin neutralized with zinc provides a golf ball with a good durability and low temperature durability.

Specific examples of (b-4) the ternary ionomer resin include trade name "Himilan (registered trademark) (e.g. Himilan AM7327 (Zn), Himilan 1855 (Zn), Himilan 1856 (Na), Himilan AM7331 (Na), or the like)" commercially available from Du Pont-Mitsui Polychemicals Co., Ltd. Further, the ternary ionomer resins commercially available from E.I. du Pont de Nemours and Company include trade name "Surlyn (registered trademark) (e.g. Surlyn 6320 (Mg), Surlyn 8120 (Na), Surlyn 8320 (Na), Surlyn 9320 (Zn), Surlyn 9320W (Zn) or the like)". Further, ionomer resins commercially available from ExxonMobil Chemical Corporation include trade name "Iotek (registered trademark) (e.g. Iotek 7510 (Zn), Iotek 7520 (Zn) or the like)". It is noted that Na, Zn, Li, and Mg described in the parentheses after the trade names indicate metal types of neutralizing metal ions. (b-4) The ternary ionomer resins may be used alone or as a mixture of at least two of them.

(b-4) The ternary ionomer resin preferably has a bending stiffness of 10 MPa or more, more preferably 11 MPa or more, even more preferably 12 MPa or more, and preferably has a bending stiffness of 100 MPa or less, more preferably 97 MPa or less, even more preferably 95 MPa or less. If the bending stiffness of (b-4) the ternary ionomer resin is too low, the flight distance tends to be shorter because of the increased spin rate on long iron shots. If the bending stiffness is too high, the durability of the golf ball may be lowered.

The melt flow rate (190° C., 2.16 kg) of (b-4) the ternary ionomer resin is preferably 0.1 g/10 min or more, more preferably 0.3 g/10 min or more, and even more preferably 0.5 g/10 min or more, and is preferably 20 g/10 min or less, more preferably 15 g/10 min or less, even more preferably 10 g/10 min or less. If the melt flow rate of (b-4) the ternary ionomer resin is 0.1 g/10 min or more, the intermediate layer has better fluidity, and for example, it is easy to mold a thin intermediate layer. If the melt flow rate of (b-4) the ternary ionomer resin is 20 g/10 min or less, the durability of the resultant golf ball becomes better.

(b-4) The ternary ionomer resin preferably has a slab hardness of 20 or more, more preferably 25 or more, even more preferably 30 or more, and preferably has a slab hardness of 70 or less, more preferably 65 or less, even more preferably 60 or less in Shore D hardness. If the ternary ionomer resin has a slab hardness of 20 or more in Shore D hardness, the resultant intermediate layer does not become excessively soft and thus the golf ball has higher resilience. If the ternary ionomer resin has a slab hardness of 70 or less in Shore D hardness, the resultant intermediate layer does not become excessively hard and thus the golf ball has better durability.

The intermediate layer composition of the present invention may further include (C) a polyamide resin composition. If (C) the polyamide resin composition is contained, since it is possible to adjust the hardness and flexural modulus, it is easy to strike a balance between a shot feeling and a spin performance. (C) The polyamide resin composition preferably comprises (c-1) a polyamide resin and (c-2) a resin having at least one functional group selected from the group consisting of a hydroxyl group, a carboxyl group, an anhydride group, a sulfonic acid group, and an epoxy group (including a glycidyl group), for example, a mixture of (c-1) a polyamide resin and (c-2) a resin having at least one functional group selected from the group consisting of a hydroxyl group, a carboxyl group, an anhydride group, a sulfonic acid group, and an epoxy group (including a glycidyl group). Containing (c-2) component improves the impact resistance of (c) the polyamide resin composition.

(c-1) The polyamide resin contained in (C) the polyamide resin composition will be explained. (c-1) The polyamide resin is not limited, as long as it is a polymer having plurality of amide bonds (—NH—CO—) in a main molecular chain. Examples of (c-1) the polyamide resin include a product having an amide bond formed by a ring-opening polymerization of lactam or a reaction between a diamine component and a dicarboxylic acid component.

Examples of the lactam include ε-caprolactam, undecane lactam, lauryl lactam. Examples of the diamine include hexamethylenediamine, nonanediamine, methylpentadiamine, p-phenylenediamine, m-phenylenediamine, p-xylylenediamine, and m-xylylenediamine. Examples of the dicarboxylic acid include adipic acid, azelaic acid, sebacic acid, terephthalic acid, and isophthalic acid.

(c-1) The polyamide resin preferably does not contain the polymerized fatty acid as the dicarboxylic acid. Examples of (c-1) the polyamide resin are, an aliphatic polyamide such as polyamide 6, polyamide 11, polyamide 12, polyamide 66, polyamide 610, polyamide 6T, polyamide 6I, polyamide 9T, polyamide M5T, polyamide 612; and an aromatic polyamide such as poly-p-phenyleneterephthalamide, poly-m-phenyleneisophthalamide. These polyamides may be used individually or in combination of at least two of them. Among them, the aliphatic polyamide such as polyamide 6, polyamide 66, polyamide 11, polyamide 12 is preferable.

Specific examples of (c-1) the polyamide resin include, "Rilsan (registered trademark) B (for example, Rilsan BESN TL, Rilsan BESN P20 TL, Rilsan BESN P40 TL, Rilsan MB3610, Rilsan BMF 0, Rilsan BMN 0, Rilsan BMN 0 TLD, Rilsan BMN BK TLD, Rilsan BMN P20 D, Rilsan BMN P40 D)" available from Arkema Inc; "Novamid (registered trademark) (for example, 1010C2, 1011CH5, 1013C5, 1010N2, 1010N2-2, 1010N2-1ES, 1013G(H)10-1, 1013G(H)15-1, 1013G(H)20-1, 1013G(H)30-1, 1013G(H)45-1, 10155G33, 1015 GH35, 1015GSTH, 1010GN2-30, 1015F2, ST220, ST145, 3010SR, 3010N5-SL4, 3021G(H)30, 3010GN30)" available from DSN engineering plastics, "Amilan (registered trademark) (for example, CM1007, CM1017, CM1017XL3, CM1017K, CM1026, CM3007, CM3001-N, CM3006, CM3301 L, CM1011G-15, CM1001G-15, CM1001G-20, CM1011G-30, CM1016G-30, CM1011G-45, CM1016G-45N, CM1001R, CM3001G-15, CM3006G-15, CM3001G-30, CM3006G-30, CM3001G-45, CM3006G-45, CM3511G33, CM3511G50, CM3511G60, CM3516G33, CM3501G50, EA1R21G33, CM3001R, CM1014-V0, CM3004-V0, CM3304-V0, CM3004G-15, CM3004G-20, CM3004G-30, HF3074G-15, HF3074G-30, HF3064G15, HF3064G30, CM1023G1000, CM1003G30, CM3003G1000, CM3003G30, CM3903GX01, U121, U141, U127GX07, U320, U328, U625×2)" available from Toray industries Inc.

(c-2) The resin having at least one functional group selected from the group consisting of a hydroxyl group, a carboxyl group, an anhydride group, a sulfonic acid group, and an epoxy group (including a glycidyl group) (hereinafter, sometimes merely referred to as "(c-2) functional group-containing resin") contained in (C) the polyamide resin composition will be explained.

(c-2) The functional group-containing resin is not limited, as long as it has at least one functional group selected from the group consisting of a hydroxyl group (—OH), a carboxyl group (—COOH), an anhydride group (—CO—O—CO—), a sulfonic acid group (—SO$_3$H), and an epoxy group (—COC—) (including a glycidyl group). It is noted that (c-2) the functional group-containing resin does not include (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester.

(c-2) The functional group-containing resin is preferably, for example, without limitation, a thermoplastic elastomer. Examples of the thermoplastic elastomer include a thermoplastic polyolefin elastomer, a thermoplastic polyester elastomer, a thermoplastic polyamide elastomer, a thermoplastic polyurethane elastomer, and a thermoplastic styrene elastomer. Among them, the thermoplastic polyolefin elastomer and the thermoplastic styrene elastomer are preferable.

The thermoplastic polyolefin elastomer preferably contains ethylene as a component. Examples of the thermoplastic polyolefin elastomer having a functional group include an ethylene-glycidyl (meth)acrylate copolymer, an ethylene-(meth)acrylic acid ester-glycidyl (meth)acrylate copolymer, and an ethylene-glycidyl (meth)acrylate-vinyl acetate copolymer.

The thermoplastic styrene elastomer is preferably a hydrogenated product of a block copolymer consisting of a polystyrene block and a block mainly composed of a conjugated diene compound. Herein, a hydrogenated product of the block copolymer means that at least a part of unsaturated bonds derived from the conjugated diene compound in the block copolymer is hydrogenated. The polystyrene elastomer preferably includes a hydrogenated product (styrene-ethylene-butylene-styrene block polymer (SEBS)) of a block copolymer using 1,3-butadiene as the conjugated diene compound, and a hydrogenated product (styrene-ethylene/propylene-styrene (SEPS)) of a block copolymer using 2-methyl-1,3-butadiene as the conjugated diene compound.

Specific examples of (c-2) the resin having a functional group include thermoplastic polyolefin elastomers having a functional group such as "LOTARDER AX8840" manufactured by Arkema Inc., "ARUFON (registered trademark) UG-4030" manufactured by Toagosei Co., Ltd., "Bond Fast (registered trademark) E" manufactured by Sumitomo Chemical Co., Ltd.; and thermoplastic styrene elastomers having a functional groups such as "Tuftec (registered trademark) M1913 and Tuftec M1943" manufactured by Asahi Kasei Corporation, "FUSABOND (registered trademark) NM052D" manufactured by E.I. du Pont de Nemours and Company, "Dynaron (registered trademark) 4630P" manufactured by JSR Corporation. Specific examples of (C) the polyamide resin composition include "NOVAMID (registered trademark) ST120" available from Mitsubishi Engineering-Plastics Company.

The melt flow rate (240° C., 2.16 kg) of (C) the polyamide resin composition is preferably 5.0 g/10 min or more, more preferably 6.0 g/10 min or more, and even more preferably 7.0 g/10 min or more, and is preferably 150 g/10 min or less, more preferably 120 g/10 min or less, and even more preferably 110 g/10 min or less. If the melt flow rate of (C) the polyamide resin composition is 5.0 g/10 min or more, since the fluidity of the intermediate layer composition becomes good, it is possible to make a thin-walled intermediate layer. Thus, the spin rate can be reduced upon a shot with a long iron and the like, thereby obtaining a great flight distance. If the melt flow rate of (C) the polyamide resin composition is 150 g/10 min or less, the durability of the resultant golf ball improves.

The flexural modulus of (C) the polyamide resin composition is 500 MPa or more, preferably 520 MPa or more, and more preferably 550 MPa or more, and is 4,000 MPa or less, preferably 3,500 MPa or less, and more preferably 3,000 MPa or less. If the flexural modulus of (C) the polyamide resin composition is 500 MPa or more, the intermediate layer has a sufficient resilience, and hence the effect of reducing the spin rate when hitting the long iron shot is obtained. If the flexural modulus of (C) the polyamide resin composition is 4,000 MPa or less, the intermediate layer is not excessively hard, and thus the shot feeling and durability becomes good.

In the present invention, the intermediate layer composition may further contain a pigment component such as a white pigment (for example, titanium oxide), a blue pigment or the like; a weight adjusting agent; a dispersant; an antioxidant; an ultraviolet absorber; a light stabilizer; a fluorescent material; a fluorescent brightener; or the like, as long as they do not impair the effect of the present invention. In the intermediate layer composition, a fatty acid or a metal salt thereof may be used in combination as a fluidity improving agent to the extent that the effect of the present invention does not deteriorate. However, it is not preferable that the fatty acid or the metal salt thereof is used in combination, because low molecular weight materials such as the fatty acid and the metal salt thereof may cause low adhesion to the cover and low mechanical properties of the intermediate layer.

In the case that the intermediate layer composition of the present invention comprises, as a resin component, (A) component and (B) component, the content of (A) component is preferably 10 mass % to 80 mass %, more preferably 15 mass % to 60 mass %, even more preferably 25 mass % to 60 mass %, and the content of (B) component is 20 mass % to 90 mass %, more preferably 40 mass % to 85 mass %, even more preferably 40 mass % to 75 mass %. In the case that the intermediate layer composition of the present invention comprises (C) component, the content of (A) component is preferably 1 mass % to 70 mass %, more preferably 5 mass % to 50 mass %, the content of (B) component is preferably 15 mass % to 65 mass %, more preferably 20 mass % to 60 mass %, and the content of (C) component is preferably 15 mass % to 60 mass %, more preferable, 20 mass % to 60 mass %. Herein, the total of the respective components becomes 100 mass %. Further, a mass ratio ((C)/(A)) of (C) component to (A) component preferably ranges from 1 to 15, more preferably ranges from 5 to 14. If the ratio of (C) component to (A) component is high, a balance between the fluidity and the durability becomes better.

The intermediate layer resin composition of the present invention can be obtained, for example, by dry blending (A) component, and (B) component, where necessary (C) component. The dry blended mixture may be extruded in the form of pellet. The dry blending may be carried out using for example, a mixer capable of blending a raw material in the form of pellet, more preferably a tumbler type mixer. Extruding can be carried out by publicly known extruders such as a single-screw kneading extruder, a twin-screw kneading extruder, and a twin-single kneading extruder.

The melt flow rate (240° C., 2.16 kg) of the intermediate layer resin composition of the present invention is preferably 10 g/10 min or more, more preferably 15 g/10 min or more, and even more preferably 18 g/10 min or more, and is preferably 100 g/10 min or less, more preferably 70 g/10 min or less, even more preferably 40 g/10 min or less. If the melt flow rate of the intermediate layer resin composition falls within the above range, the moldability becomes better.

The intermediate layer resin composition of the present invention preferably has a slab hardness of 66 or more, more preferably 67 or more, and preferably has a slab hardness of 75 or less, more preferably 74 or less, even more preferably 73 or less in Shore D hardness. Use of the intermediate layer composition having a slab hardness of 66 or more in Shore D hardness provides a core with an outer-hard inner soft structure, and thus provides a golf ball exhibiting a high launch angle and low spin rate on long iron shots. As a result, the flight distance becomes greater on long iron shots. On the other hand, use of the intermediate layer composition having a slab hardness of 75 or less in Shore D hardness provides a golf ball with excellent durability. Herein, the slab hardness of the intermediate layer composition is a measured hardness of the intermediate layer composition that is molded into a sheet form by a measuring method described later.

The intermediate layer composition of the present invention preferably has a flexural modulus of 350 MPa or more, more preferably 370 MPa or more, even more preferably 400 MPa or more, and preferably has a flexural modulus of 1,000 MPa or less, more preferably 900 MPa or less, even more preferably 800 MPa or less. If the flexural modulus of the intermediate layer composition is 350 MPa or more, since the obtained golf ball has an outer-hard inner soft structure, the flight distance becomes great. On the other hand, if the bending stiffness of the intermediate layer composition is 1,000 MPa or less, the obtained golf ball becomes appropriately soft and thus the shot feeling becomes good.

The melt flow rate, flexural modulus, and the slab hardness of the intermediate layer composition can be adjusted by appropriately selecting kinds, amount or the like of (A) component, (B) component, and (C) component.

The golf ball of the present invention is not limited, as long as the golf ball comprises an intermediate layer formed from the above intermediate layer composition. For example, in a three-piece golf ball comprising a core having a center and a single-layered intermediate layer disposed around the center, and a cover disposed around the core, or in a multi-piece golf ball comprising a core having a center and at least one intermediate layer disposed around the center, and a cover disposed around the core (including the three-piece golf ball mentioned above), at least one of the intermediate layer is formed from the above intermediate layer composition.

In the followings, the present invention will be explained based on the preferable golf ball (including a three-piece golf ball) that comprises a core having a center and at least one intermediate layer disposed around the center and a cover disposed around the core, wherein at least one of the intermediate layer is formed from the above intermediate layer composition.

The core of the golf ball of the present invention preferably includes, for example, a multi-layered core having a center and at least one intermediate layer covering the center. The core preferably has a spherical shape. If the core does not have a spherical shape, the cover does not have a uniform thickness. As a result, there exist some portions where the performance of the cover is lowered.

On the other hand, the center generally has the spherical shape, but the center may be provided with a rib on the surface thereof so that the surface of the spherical center is divided by the ribs. For example, the surface of the spherical center is evenly divided by the ribs. In one embodiment, the ribs are preferably formed on the surface of the spherical center in an integrated manner, and in another embodiment, the ribs are formed as an intermediate layer on the surface of the spherical center. The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east (west), assuming that the meridian as the standard is at longitude 0 degree. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

A conventionally known rubber composition (hereinafter, sometimes simply referred to as "center rubber composition") may be employed for the center of the golf ball of the present invention, and the center can be molded by, for example, heat-pressing a rubber composition containing a base rubber, a crosslinking initiator, a co-crosslinking agent, and a filler.

As the base rubber, a natural rubber and/or a synthetic rubber may be used. Examples of the base rubber are a polybutadiene rubber, a natural rubber, a polyisoprene rubber, a styrene polybutadiene rubber, and ethylene-propylene-diene terpolymer (EPDM). Among them, typically preferred is the high cis-polybutadiene having cis-1,4-bond in a proportion of 40% or more, more preferably 70% or more, even more preferably 90% or more in view of its superior resilience property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.3 part by mass or more, more preferably 0.4 part by mass or more, and is preferably 5 parts by mass or less, more preferably 3 parts by mass or less based on 100 parts by mass of the base rubber. If the amount is less than 0.3 part by mass, the center becomes too soft, and the resilience tends to be lowered, and if the amount is more than 5 parts by mass, the amount of the co-crosslinking agent must be increased in order to obtain the appropriate hardness, which tends to cause the insufficient resilience.

The co-crosslinking agent is not particularly limited, as long as it serves to crosslink a rubber molecule by graft polymerization to a base rubber molecular chain; for example, an α,β-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high resilience.

The amount of the co-crosslinking agent to be used is preferably 10 parts or more, more preferably 15 parts or more, even more preferably 20 parts or more, and is preferably 55 parts or less, more preferably 50 parts or less, even more preferably 48 parts or less, based on 100 parts of the base rubber by mass. If the amount of the co-crosslinking agent to be used is less than 10 parts by mass, the amount of the crosslinking initiator must be increased to obtain an appropriate hardness, which tends to lower the resilience. On the other hand, if the amount of the co-crosslinking agent to be used is more than 55 parts by mass, the center becomes too hard, so that the shot feeling may be lowered.

The filler contained in the center rubber composition is mainly blended as a weight adjusting agent in order to adjust the weight of the golf ball obtained as the final product, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 0.5 part or more, more preferably 1 part or more, and is preferably 30 parts or less, more preferably 20 parts or less based on 100 parts of the base rubber by mass. If the amount of the filler to be blended is less than 0.5 part by mass, it becomes difficult to adjust the weight, while if it is more than 30 parts by mass, the weight ratio of the rubber component becomes small and the resilience tends to be lowered.

As the center rubber composition, an organic sulfur compound, an antioxidant or a peptizing agent may be blended appropriately in addition to the base rubber, the crosslinking initiator, the co-crosslinking agent and the filler.

As the organic sulfur compound, diphenyl disulfide or a derivative thereof may be preferably used. Examples of the diphenyl disulfide or the derivative thereof include diphenyl disulfide; mono-substituted diphenyl disulfide such as bis (4-chlorophenyl) disulfide, bis(3-chlorophenyl) disulfide, bis (4-bromophenyl) disulfide, bis(3-bromophenyl) disulfide, bis (4-fluorophenyl) disulfide, bis(4-iodophenyl) disulfide and bis(4-cyanophenyl) disulfide; di-substituted diphenyl disulfide such as bis(2,5-dichlorophenyl) disulfide, bis(3,5-dichlorophenyl) disulfide, bis(2,6-dichlorophenyl) disulfide, bis(2, 5-dibromophenyl) disulfide, bis (3,5-dibromophenyl) disulfide, bis(2-chloro-5-bromophenyl) disulfide, and bis(2-cyano-5-bromophenyl) disulfide; tri-substituted diphenyl disulfide such as bis (2,4,6-trichlorophenyl) disulfide, and bis(2-cyano-4-chloro-6-bromophenyl) disulfide; tetra-substituted diphenyl disulfide such as bis(2,3,5,6-tetra chlorophenyl) disulfide; penta-substituted diphenyl disulfide such as bis(2,3,4,5,6-pentachlorophenyl) disulfide and bis(2,3,4,5, 6-pentabromophenyl) disulfide. These diphenyl disulfides or the derivative thereof can enhance resilience by having some influence on the state of vulcanization of vulcanized rubber. Among them, diphenyl disulfide or bis(pentabromophenyl) disulfide is preferably used since the golf ball having particularly high resilience can be obtained. The amount of the diphenyl disulfide or the derivative thereof to be blended is preferably 0.1 part by mass or more, more preferably 0.3 part by mass or more, and is preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

The center can be obtained by mixing, kneading the above mentioned rubber composition and molding the rubber composition in the mold. The conditions for press-molding the center rubber composition should be determined depending on the rubber composition. Specifically, the press-molding is preferably carried out for 10 to 60 minutes at the temperature of 130° C. to 200° C. under the pressure from 2.9 MPa to 11.8 MPa. Alternatively, the press-molding is preferably carried out in a two-step heating, for example, for 20 to 40 minutes at the temperature of 130° C. to 150° C., and continuously for 5 to 15 minutes at the temperature of 160° C. to 180° C.

The diameter of the center is preferably 34.8 mm or more, more preferably 35.0 mm or more, and even more preferably 35.2 mm or more, and is preferably 41.2 mm or less, more preferably 41.0 mm or less, and even more preferably 40.8 mm or less. If the diameter of the center is 34.8 mm or more, the intermediate layer or the cover layer does not become excessively thick, and hence the resilience of the golf ball becomes good. On the other hand, if the diameter of the center is 41.2 mm or less, the intermediate layer or the cover does not become excessively thin, and hence the intermediate layer or the cover functions better.

When the center has a diameter from 34.8 mm to 41.2 mm, a compression deformation amount (shrinking deformation amount of the center along the compression direction) of the center when applying a load from 98 N as an initial load to 1275 N as a final load is preferably 1.90 mm or more, more preferably 2.00 mm or more, even more preferably 2.10 mm or more, and is preferably 4.00 mm or less, more preferably 3.90 mm or less, even more preferably 3.80 mm or less. If the compression deformation amount is 1.90 mm or more, the shot feeling becomes good, while if the compression deformation amount is 4.00 mm or less, the resilience becomes better.

The surface hardness of the center is preferably 45 or larger, more preferably 50 or larger, and even more preferably 55 or larger, and is preferably 65 or smaller, more preferably 62 or smaller, and even more preferably 60 or smaller in shore D hardness. If the surface hardness is 45 or more in Shore D hardness, the center does not become excessively soft and the resilience becomes good. If the surface hardness of the center is 65 or less in Shore D hardness, the center does not become so hard and the shot feeling becomes good.

The intermediate layer is, for example, formed by covering the center with the intermediate layer composition of the present invention. An embodiment for molding the intermediate layer is not particularly limited, and includes an embodiment which comprises injection molding the intermediate layer composition directly onto the center, or an embodiment which comprises molding the intermediate layer composition into a half hollow-shell, covering the center with the two half hollow-shells, and subjecting the center with the two half hollow-shells to the compression-molding at the temperature of 130° C. to 170° C. for 1 min to 5 mins. The intermediate layer of the golf ball of the present invention is preferably formed by injection molding. The intermediate layer can be produced more easily by injection molding.

In the case of directly injection molding the intermediate layer composition onto the center, the intermediate layer composition in the pellet form may be used for injection molding, or the materials such as the resin components and the pigment may be dry blended, followed by directly injection molding the blended material. In the present invention, it is preferable to use the intermediate layer composition in the pellet form which is obtained by extrusion for injection molding. It is also preferred to use upper and lower molds having a spherical cavity and pimples for forming the intermediate layer, wherein a part of the pimple also serves as a retractable hold pin. When forming the intermediate layer by injection molding, the hold pin is protruded to hold the center, and the intermediate layer composition which has been heated and melted is charged and then cooled to obtain the intermediate layer.

When molding the intermediate layer in a compression molding method, molding of the half shell can be performed by either compression molding method or injection molding method, and the compression molding method is preferred. The compression-molding of the intermediate layer composition into half shell can be carried out, for example, under a pressure of 1 MPa or more and 20 MPa or less at a temperature of −20° C. or more and 70° C. or less relative to the flow beginning temperature of the intermediate layer composition. By performing the molding under the above conditions, a half shell having a uniform thickness can be formed. Examples of a method for molding the intermediate layer using half shells include compression molding by covering the center with two half shells. The compression molding of half shells into the intermediate layer can be carried out, for example, under a pressure of 0.5 MPa or more and 25 MPa or less at a temperature of −20° C. or more and 70° C. or less relative to the flow beginning temperature of the intermediate layer composition. By performing the molding under the above conditions, the intermediate layer having a uniform thickness can be formed.

The molding temperature means the highest temperature where the temperature at the surface of the concave portion of the lower mold reaches from closing through opening the molds. Further, the flow beginning temperature of the intermediate layer composition can be measured in a pellet form under the following conditions by using a flow characteristics evaluation apparatus (Flow Tester CFT-500, manufactured by Shimadzu Corporation).

Measuring conditions: Area size of a plunger: 1 cm$^2$, Die length: 1 mm, Die diameter: 1 mm, Load: 588.399 N, Start temperature: 30° C., and Temperature increase rate: 3° C./min.

The thickness of the intermediate layer of the golf ball of the present invention is preferably 1.5 mm or less, more preferably 1.4 mm or less, and even more preferably 1.2 mm or less. If the thickness of the intermediate layer is 1.5 mm or less, the resilience and shot feeling of the golf ball are improved. The thickness of the intermediate layer is preferably 0.5 mm or more, more preferably 0.6 mm or more, even more preferably 0.7 mm or more. If the thickness of the intermediate layer is 0.5 mm or more, it is easier to mold the intermediate layer. Further, the durability of the resultant golf ball is enhanced.

In the case that the golf ball of the present invention has at least two intermediate layers, at least one of the intermediate layers may be formed from the intermediate layer resin composition of the present invention. In this case, it is preferred that the outermost layer of the core is an intermediate layer formed from the intermediate layer composition of the present invention, and it is more preferred that all the intermediate layers are formed from the intermediate layer composition of the present invention.

In one preferable embodiment, the diameter of the core of the golf ball is preferably 39.0 mm or more, more preferably 39.5 mm or more, and even more preferably 40.8 mm or more. If the diameter of the core is less than 39.0 mm, the cover becomes excessively thick and hence the resilience of the golf ball may deteriorate. Further, the diameter of the core is preferably 42.2 mm or less, more preferably 42.0 mm or less, and even more preferably 41.8 mm or less. If the diameter of the core is more than 42.2 mm, the thickness of the cover becomes relatively thin, and hence a protection effect of the cover is not obtained sufficiently.

When the core has a diameter from 39.0 mm to 42.2 mm, a compression deformation amount (shrinking deformation amount of the core along the compression direction) of the core when applying a load from 98 N as an initial load to 1275 N as a final load is preferably 1.90 mm or more, more preferably 2.00 mm or more, even more preferably 2.10 mm or more, and is preferably 4.00 mm or less, more preferably 3.90 mm or less, even more preferably 3.80 mm or less. If the compression deformation amount is less than 1.90 mm, the core becomes too hard, resulting in the poor shot feeling, while if the compression deformation amount is more than 4.00 mm, the core becomes too soft, resulting in the heavy shot feeling.

The center hardness of the core is preferably 30 or larger, more preferably 32 or larger, and even more preferably 35 or larger in Shore D hardness. If the center hardness is smaller than 30 in Shore D hardness, the core becomes so soft that the resilience of the golf ball tends to become lower. The center hardness of the core is preferably 50 or smaller, more preferably 48 or smaller, and even more preferably 46 or smaller in Shore D hardness. If the center hardness is more than 50 in Shore D hardness, the core becomes too hard, resulting in the poor shot feeling. In the present invention, the center hardness of the core is the hardness measured with the Shore D type spring hardness tester at the central point of a cut plane of a core which has been cut into two halves.

The surface hardness of the core is preferably 55 or larger, more preferably 56 or larger, and even more preferably 57 or larger in Shore D hardness. If the surface hardness is less than 55 in Shore D hardness, the core becomes so soft and the resilience may be lowered. The surface hardness of the core is preferably 75 or smaller, more preferably 73 or smaller, and even more preferably 70 or smaller in shore D hardness. If the surface hardness is more than 75 in Shore D hardness, the core becomes so hard and the shot feeling may be lowered.

In one preferable embodiment, the surface hardness of the core is made larger than the center hardness of the core. Making the core have the surface hardness larger than the center hardness provides a golf ball with a high launch angle and a low spin rate on long iron shots. The golf ball with a high launch angle and a low spin rate travels a great flight distance. The hardness difference (surface hardness-center hardness) between the surface hardness and the center hardness of the core in the golf ball of the present invention is preferably 4 or larger, more preferably 7 or larger in Shore D hardness. Further, the hardness difference (surface hardness-center hardness) between the surface hardness and the center hardness of the core in the golf ball of the present invention is preferably 40 or less, more preferably 35 or less. If the hardness difference is too large, the durability of the golf ball may deteriorate.

In one preferable embodiment, the cover of the golf ball of the present invention is formed from a cover composition containing a resin component. The resin component includes, for example, ionomer resins having a commercial name of "Himilan" available from Du Pont-Mitsui Polychemicals Co., Ltd., a commercial name of "Surlyn" available from E.I. du Pont de Nemours and Company, or a commercial name of "lotek" available from available from ExxonMobil Chemical Corporation, a thermoplastics polyurethane elastomer having a commercial name of "Elastollan (registered trademark) (e.g. "Elastollan XNY85A" "Elastollan XNY97A")" commercially available from BASF Japan Ltd; a thermoplastic polyamide elastomer having a commercial name of "Pebax (registered trademark) (e.g. "Pebax 2533")" commercially available from Arkema K. K.; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic polystyrene elastomer having a commercial name of "Rabalon (registered trademark) (e.g. "Rabalon T3221C")" commercially available from Mitsubishi Chemical Corporation. Further, (b-1) a binary copolymer composed of an olefin and an $\alpha,\beta$-unsaturated carboxylic acid having 3 to 8 carbon atoms and (b-3) a ternary copolymer composed of an olefin, an $\alpha,\beta$-unsaturated carboxylic acid having 3 to 8 carbon atoms, and an $\alpha,\beta$-unsaturated carboxylic acid ester of (B) component can be used. These resin components are used solely or as a mixture of at least two of them.

In one preferable embodiment, the cover composition preferably contains the thermoplastic polyurethane elastomer or the ionomer resin, as the resin component. The content of the thermoplastic polyurethane elastomer or the ionomer resin in the resin component of the cover composition is preferably 50 mass % or more, more preferably 60 mass % or more, even more preferably 70 mass % or more. In more preferable embodiment, the cover composition contains the thermoplastic polyurethane elastomer as the resin component. The polyurethane cover improves the controllability on approach shots.

In the present invention, in addition to the aforementioned resin component, the cover composition may further contain a pigment component such as a white pigment (for example, titanium oxide), a blue pigment, a red pigment, or the like; a weight adjusting agent such as zinc oxide, calcium carbonate, barium sulfate, or the like; a dispersant; an antioxidant; an ultraviolet absorber; a light stabilizer; a fluorescent material; a fluorescent brightener; or the like, as long as they do not impair the performance of the cover.

The amount of the white pigment (for example, titanium oxide), with respect to 100 parts by mass of the resin component constituting the cover, is preferably 0.5 part by mass or more, more preferably 1 part by mass or more, and is preferably 10 parts by mass or less, more preferably 8 parts by mass or less. If the amount of the white pigment is 0.5 parts by mass or more, it is possible to impart the opacity to the cover. If the amount of the white pigment is more than 10 parts by mass, the durability of the cover may deteriorate.

The cover composition preferably has a slab hardness of 65 or less, more preferably 60 or less, even more preferably 55 or less in Shore D hardness. If the cover composition has a slab hardness of 65 or less, the spin rate on the approach shots with short irons increases. As a result, the golf ball having a good controllability on the approach shots is obtained. In order to ensure the spin rate sufficiently for the approach shots, the cover composition preferably has a slab hardness of 20 or more, more preferably 25 or more, even more preferably 30 or more in Shore D hardness.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

When molding the cover in a compression molding method, molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In the case of directly injection molding the cover composition onto the core, it is preferred to use upper and lower molds having a spherical cavity and pimples for forming a cover, wherein a part of the pimples also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 200° C. to 250°

C. is charged into a mold held under the pressure of 9 MPa to 15 MPa for 0.5 to 5 second. After cooling for 10 to 60 seconds, the mold is opened and the golf ball with the cover molded is taken out from the mold.

When molding a cover, the concave portions called "dimple" are usually formed on the surface. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, and roughly hexagonal shape, another irregular shape. The shape of the dimples is employed solely or in combination at least two of them.

In the present invention, the thickness of the cover of the golf ball is preferably 2.0 mm or less, more preferably 1.6 mm or less, even more preferably 1.2 mm or less, most preferably 1.0 mm or less. If the thickness of the cover is 2.0 mm or less, the resilience and shot feeling of the obtained golf ball become better. The thickness of the cover is preferably 0.1 mm or more, more preferably 0.2 mm or more, and even more preferably 0.3 mm or more. If the thickness of the cover is less than 0.1 mm, it may become difficult to mold the cover. In addition, the durability and the abrasion resistance of the cover may deteriorate.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 25 μm or smaller, and more preferably 18 μm or smaller. If the thickness is smaller than 5 μm, the paint film is easy to wear off due to continued use of the golf ball, and if the thickness is larger than 25 μm, the effect of the dimples is reduced, resulting in lowering flying performance of the golf ball.

When the golf ball of the present invention has a diameter in a range from 40 mm to 45 mm, a compression deformation amount of the golf ball (an amount of compression of the golf ball in the compression direction thereof) when applying an initial load of 98 N to a final load of 1275 N to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard, and thus exhibits the good shot feeling. On the other hand, if the compression deformation amount is 4.0 mm or less, the resilience is enhanced.

EXAMPLES

Hereinafter, the present invention will be described in detail by way of example. The present invention is not limited to examples described below. Various changes and modifications can be made without departing from the spirit and scope of the present invention.
(1) Melt Flow Rate (MFR) (g/10 min)

The MFR was measured using a flow tester (Shimadzu flow tester CFT-100C manufactured by Shimadzu Corporation) in accordance with JIS K7210. The measurements were conducted under the conditions of the measurement temperature 190° C. and the load of 2.16 kg, 210° C. and the load of 2.16 kg, 230° C. and the load of 2.16 kg, and 240° C. and the load of 2.16 kg.
(2) Flexural Modulus (MPa)

Test pieces with a length of 80.0±2 mm, a width of 10.0±0.2 mm, and a thickness of 4.0±0.2 mm were produced by injection molding the resin component constituting the intermediate layer or the intermediate layer composition, and immediately stored at 23° C.±2° C. for 24 hours or more in a moisture-proof container. The test pieces were taken out from the moisture-proof container and immediately (within 15 minutes) the flexural modulus of the test pieces were measured according to ISO178. The measurement was conducted at a temperature of 23° C. and a humidity of 50% RH.
(3) Slab Hardness (Shore D Hardness)

Sheets with a thickness of about 2 mm were produced by injection molding the cover composition, the resin component constituting the intermediate layer, and the intermediate layer composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.
(4) Hardness of Center and Core (Shore D Hardness)

A type P1 auto loading durometer manufactured by Kobunshi Keiki Co., Ltd., provided with a Shore D type spring hardness tester prescribed in ASTM-D2240 standard was used to measure the surface hardness Hs1 of the center and the surface hardness Hs of the core. Shore D hardness measured at the surfaces of the center and the core were adopted as the surface hardness Hs1 of the center and the surface hardness Hs of the core, respectively. The core was cut into two hemispheres to obtain a cut plane, and a Shore D hardness measured at the center of the cut plane was used as the central hardness Ho of the center or the core.
(5) Compression Deformation Amount (mm)

A compression deformation amount of the center, core and golf ball (a shrinking amount of the center, core, and golf ball in the compression direction thereof), when applying a load from 98 N as an initial load to 1275 N as a final load to the center, core and golf ball, was measured.
(6) Shot with a Long Iron A #5 iron (ZTXDGS200 510, manufactured by SRI Sports Limited) was installed on a swing robot M/C manufactured by Golf Laboratories, Inc. A golf ball was hit at a head speed of 41 m/sec. Regarding the spin rate of the golf ball immediately after the hit, a sequence of photographs of the hit golf ball were taken to measure the spin rate. This measurement was conducted twelve times for each golf ball, and the average value was used as the measurement value for the golf ball.
[Production of Golf Balls]
(1) Production of Center The center rubber compositions having the formulations shown in Table 1 were kneaded and heat-pressed in upper and lower molds, each having a hemispherical cavity, at 170° C. for 30 minutes to prepare spherical centers. The amount of barium sulfate was adjusted appropriately to make a golf ball have a weight of 45.4 g.

TABLE 1

|  | Center No. | A | B | C | D |
|---|---|---|---|---|---|
| Formulation | Polybutadiene rubber | 100 | 100 | 100 | 100 |
|  | Zinc acrylate | 31.5 | 31.5 | 31.5 | 33 |
|  | Zinc oxide | 5 | 5 | 5 | 5 |
|  | Dicumyl peroxide | 0.9 | 0.9 | 0.9 | 0.9 |
|  | Bis(pentabromophenyl) disulfide | 0.9 | 0.9 | 0.9 | 0.9 |
|  | Barium sulfate | Appropriate Amount*) | Appropriate Amount*) | Appropriate Amount*) | Appropriate Amount*) |
| Properties | Diameter (mm) | 40.2 | 40.0 | 39.8 | 39.8 |
|  | Compression deformation amount (mm) | 2.95 | 2.95 | 2.95 | 2.75 |
|  | Surface hardness Hs1 (Shore D) | 60 | 60 | 60 | 60 |

Formulation: parts by mass
*)Depending on the cover composition, adjustment was made such that the golf ball had a mass of 45.4 g.
Polybutadiene rubber: "BR-730 (high-cis polybutadiene)" manufactured by JSR Corporation.
Zinc acrylate: "ZNDA-90S" manufactured by Nihon Jyoryu Kogyo Co., Ltd.
Zinc oxide: "Ginrei R" manufactured by Toho Zinc Co., Ltd.
Barium sulfate: "Barium Sulfate BD" manufactured by Sakai Chemical Industry Co., Ltd.
Bis(pentabromophenyl)disulfide: manufactured by Kawaguchi Chemical Industry Co., Ltd.
Dicumyl peroxide: "Percumyl (registered trademark) D" manufactured by NOF Corporation.

(2) Preparation of Cores

Intermediate layer materials shown in Tables 2 to 5 were mixed with a twin-screw kneading extruder to prepare the intermediate layer compositions in the pellet form. The extruding conditions for the intermediate layer composition were a screw diameter of 45 mm, a screw rotational speed of 200 rpm, and screw L/D=35. The mixtures were heated at the temperature ranging from 150° C. to 230° C. at the die portion of the extruder. The intermediate layer compositions obtained above were injection-molded onto the spherical centers to form the cores having the centers and the intermediate layers covering the center (diameter: 41.7 mm).

TABLE 2

|  |  |  |  | Golf ball No. | | | |
|---|---|---|---|---|---|---|---|
|  |  |  |  | 1 | 2 | 3 | 4 |
| Intermediate layer Composition | Resin component | Center No. |  | A | A | A | A |
|  |  | Center diameter (mm) |  | 40.2 | 40.2 | 40.2 | 40.2 |
|  |  | (A) Component | PA30L | 60 | 60 | — | — |
|  |  |  | PA40L | — | — | 70 | 60 |
|  |  | (B) component | (b-2) Himilan AM7337 | 20 | 15 | 15 | 15 |
|  |  |  | (b-2) Himilan AM7329 | 20 | 15 | 15 | 15 |
|  |  |  | (b-4) Himilan AM7327 | — | 10 | — | 10 |
|  |  |  | (b-4) Surlyn 6320 | — | — | — | — |
|  |  | (C) component | Novamid ST120 | — | — | — | — |
|  |  | Titanium oxide |  | 4 | 4 | 4 | 4 |
|  |  | (A) component | Melt flow rate (g/10 min, 230° C. × 2.16 kg) | 80 | 80 | 80 | 80 |
|  |  |  | Flexural modulus (MPa) | 850 | 850 | 600 | 600 |
|  | Properties | Melt flow rate (g/10 min, 210° C. × 2.16 kg) |  | 27 | 15 | TF | 16 |
|  |  | Melt flow rate (g/10 min, 240° C. × 2.16 kg) |  | TF | TF | TF | TF |
|  |  | Moldability |  | G | G | G | G |
|  |  | Slab hardness (Shore D) |  | 70 | 69 | 71 | 69 |
|  |  | Flexural modulus (MPa) |  | 600 | 550 | 500 | 480 |
| Core Properties | Intermediate layer thickness (mm) |  |  | 0.8 | 0.8 | 0.8 | 0.8 |
|  | Core center hardness Ho (Shore D) |  |  | 40 | 40 | 40 | 40 |
|  | Core surface hardness Hs (Shore D) |  |  | 70 | 69 | 71 | 69 |
|  | Compression deformation amount (mm) |  |  | 2.35 | 2.35 | 2.35 | 2.35 |
| Golf ball Properties | Cover thickness (mm) |  |  | 0.5 | 0.5 | 0.5 | 0.5 |
|  | Compression deformation amount (mm) |  |  | 2.45 | 2.45 | 2.45 | 2.45 |
|  | Back spin rate (rpm) on Iron |  |  | 5200 | 5200 | 5150 | 5200 |
|  | Flight distance (carry, yards) on Iron |  |  | 197 | 197 | 196 | 197 |

Formulation: parts by mass
TF: Impossible to measure because of too much flow
NG: Impossible to measure
Moldability: G(Good), P(Poor)

TABLE 3

| | | | | Golf ball No. | | | |
|---|---|---|---|---|---|---|---|
| | | | | 5 | 6 | 7 | 8 |
| Intermediate layer Composition | Resin component | Center No. | | B | A | A | B |
| | | Center diameter (mm) | | 40.2 | 40.2 | 40.2 | 40.0 |
| | | (A) Component | PA30L | — | — | — | — |
| | | | PA40L | 60 | 60 | 10 | 10 |
| | | (B) component | (b-2) Himilan AM7337 | 15 | 12.5 | 10 | 10 |
| | | | (b-2) Himilan AM7329 | 15 | 12.5 | 10 | 10 |
| | | | (b-4) Himilan AM7327 | 10 | — | 10 | 10 |
| | | | (b-4) Surlyn 6320 | — | 15 | — | — |
| | | (C) component | Novamid ST120 | — | — | 60 | 60 |
| | | Titanium oxide | | 4 | 4 | 4 | 4 |
| | | (A) component | Melt flow rate (g/10 min, 230° C. × 2.16 kg) | 80 | 80 | 80 | 80 |
| | | | Flexural modulus (MPa) | 600 | 600 | 600 | 600 |
| | Properties | Melt flow rate (g/10 min, 210° C. × 2.16 kg) | | 16 | 30 | NG | NG |
| | | Melt flow rate (g/10 min, 240° C. × 2.16 kg) | | TF | TF | 25 | 25 |
| | | Moldability | | G | G | G | G |
| | | Slab hardness (Shore D) | | 69 | 69 | 69 | 69 |
| | | Flexural modulus (MPa) | | 480 | 490 | 600 | 600 |
| Core Properties | Intermediate layer thickness (mm) | | | 0.9 | 0.8 | 0.8 | 0.9 |
| | Core center hardness Ho (Shore D) | | | 40 | 40 | 40 | 40 |
| | Core surface hardness Hs (Shore D) | | | 69 | 69 | 69 | 69 |
| | Compression deformation amount (mm) | | | 2.33 | 2.35 | 2.35 | 2.33 |
| Golf ball Properties | Cover thickness (mm) | | | 0.5 | 0.5 | 0.5 | 0.5 |
| | Compression deformation amount (mm) | | | 2.43 | 2.45 | 2.45 | 2.43 |
| | Back spin rate (rpm) on Iron | | | 5150 | 5200 | 5200 | 5150 |
| | Flight distance (carry, yards) on Iron | | | 196 | 197 | 197 | 197 |

Formulation: parts by mass
TF: Impossible to measure because of too much flow
NG: Impossible to measure
Moldability: G(Good), P(Poor)

TABLE 4

| | | | | Golf ball No. | | | |
|---|---|---|---|---|---|---|---|
| | | | | 9 | 10 | 11 | 12 |
| Intermediate layer Composition | Resin component | Center No. | | C | A | D | A |
| | | Center diameter (mm) | | 39.8 | 40.2 | 39.8 | 40.2 |
| | | (A) Component | PA30L | — | — | — | — |
| | | | PA40L | 10 | 5 | — | 20 |
| | | (B) component | (b-2) Himilan AM7337 | 10 | 15 | 50 | 35 |
| | | | (b-2) Himilan AM7329 | 10 | 15 | 50 | 35 |
| | | | (b-4) Himilan AM7327 | 10 | 10 | — | 10 |
| | | | (b-4) Surlyn 6320 | — | — | — | — |
| | | (C) component | Novamid ST120 | 60 | 55 | — | — |
| | | Titanium oxide | | 4 | 4 | 4 | 4 |
| | | (A) component | Melt flow rate (g/10 min, 230° C. × 2.16 kg) | 80 | 80 | — | 80 |
| | | | Flexural modulus (MPa) | 600 | 600 | — | 600 |
| | Properties | Melt flow rate (g/10 min, 210° C. × 2.16 kg) | | NG | NG | TF | 5 |
| | | Melt flow rate (g/10 min, 240° C. × 2.16 kg) | | 25 | 20 | TF | TF |
| | | Moldability | | G | G | G | G |
| | | Slab hardness (Shore D) | | 69 | 68 | 64 | 66 |
| | | Flexural modulus (MPa) | | 600 | 550 | 310 | 390 |
| Core Properties | Intermediate layer thickness (mm) | | | 1 | 0.8 | 1 | 0.8 |
| | Core center hardness Ho (Shore D) | | | 40 | 40 | 40 | 40 |
| | Core surface hardness Hs (Shore D) | | | 69 | 68 | 64 | 66 |
| | Compression deformation amount (mm) | | | 2.31 | 2.35 | 2.35 | 2.36 |
| Golf ball Properties | Cover thickness (mm) | | | 0.5 | 0.5 | 0.5 | 0.5 |
| | Compression deformation amount (mm) | | | 2.41 | 2.45 | 2.45 | 2.46 |
| | Back spin rate (rpm) on Iron | | | 5100 | 5300 | 5500 | 5400 |
| | Flight distance (carry, yards) on Iron | | | 198 | 196 | 195 | 195 |

Formulation: parts by mass
TF: Impossible to measure because of too much flow
NG: Impossible to measure
Moldability: G(Good), P(Poor)

TABLE 5

|  |  |  |  | Golf ball No. | | | |
|---|---|---|---|---|---|---|---|
|  |  |  |  | 13 | 14 | 15 | 16 |
| Intermediate layer Composition | Resin component | Center No. | | A | A | A | A |
| | | Center diameter (mm) | | 40.2 | 40.2 | 40.2 | 40.2 |
| | | (A) Component | PA30L | — | — | — | — |
| | | | PA40L | 40 | 30 | 50 | — |
| | | (B) component | (b-2) Himilan AM7337 | 25 | 10 | 10 | 20 |
| | | | (b-2) Himilan AM7329 | 25 | 10 | 10 | 20 |
| | | | (b-4) Himilan AM7327 | 10 | 10 | 10 | — |
| | | | (b-4) Surlyn 6320 | — | — | — | — |
| | | (C) component | Novamid ST120 | — | 40 | 20 | 60 |
| | | Titanium oxide | | 4 | 4 | 4 | 4 |
| | | (A) component | Melt flow rate (g/10 min, 230° C. × 2.16 kg) | 80 | 80 | 80 | — |
| | | | Flexural modulus (MPa) | 600 | 600 | 600 | — |
| | Properties | Melt flow rate (g/10 min, 210° C. × 2.16 kg) | | 12 | NG | 8 | NG |
| | | Melt flow rate (g/10 min, 240° C. × 2.16 kg) | | TF | 35 | TF | 1.8 |
| | | Moldability | | G | G | G | P |
| | | Slab hardness (Shore D) | | 68 | 70 | 70 | 69 |
| | | Flexural modulus (MPa) | | 420 | 580 | 520 | 639 |
| Core Properties | Intermediate layer thickness (mm) | | | 0.8 | 0.8 | 0.8 | 0.8 |
| | Core center hardness Ho (Shore D) | | | 40 | 40 | 40 | *1) |
| | Core surface hardness Hs (Shore D) | | | 68 | 70 | 70 | |
| | Compression deformation amount (mm) | | | 2.35 | 2.35 | 2.35 | |
| Golf ball Properties | Cover thickness (mm) | | | 0.5 | 0.5 | 0.5 | |
| | Compression deformation amount (mm) | | | 2.45 | 2.45 | 2.45 | |
| | Back spin rate (rpm) on Iron | | | 5250 | 5100 | 5150 | |
| | Flight distance (carry, yards) on Iron | | | 196 | 198 | 197 | |

Formulation: parts by mass
TF: Impossible to measure because of too much flow
NG: Impossible to measure
*1) Impossible to mold
Moldability: G(Good), P(Poor)

Notes on Tables No. 2 to No. 5
PA30L: Polyamide copolymer (Flexural modulus: 850 MPa, Melt Flow Rate (230° C., 2.16 kg): 80 g/10 min, Shore D hardness: 76) available from FujiKasei Kogyo Co., Ltd.
PA40L: Polyamide copolymer (Flexural modulus: 600 MPa, Melt Flow Rate (230° C., 2.16 kg): 80 g/10 min, Shore D hardness: 73) available from FujiKasei Kogyo Co., Ltd.
HIMILAN AM7337: a sodium ion neutralized ethylene-methacrylic acid copolymer ionomer resin (Melt Flow Rate (190° C., 2.16 kg): 5 g/10 min, Bending stiffness: 254 MPa) available from Du Pont-Mitsui Polychemicals Co., Ltd.
HIMILAN AM7329: a zinc ion neutralized ethylene-methacrylic acid copolymer ionomer resin (Melt Flow Rate (190° C., 2.16 kg): 5 g/10 min, Bending stiffness: 221 MPa) available from Du Pont-Mitsui Polychemicals Co., Ltd.
HIMILAN AM7327: a zinc ion neutralized ethylene-methacrylic acid-butyl acrylate ternary copolymerized ionomer resin (Melt Flow Rate (190° C., 2.16 kg): 0.7 g/10 min, Bending stiffness: 35 MPa) available from Du Pont-Mitsui Polychemicals Co., Ltd.
SURLYN 6320: a magnesium ion neutralized ethylene-methacrylic acid-butyl acrylate ternary copolymerized ionomer resin (Melt Flow Rate (190° C., 2.16 kg): 1.0 g/10 min, Bending stiffness: 53 MPa) available from E.I. du Pont de Nemours and Company.
NOVAMID ST120: a mixed resin of polyamide 6 and a resin having at least one functional group selected from the group consisting of a hydroxyl group, a carboxyl group, an anhydride group, a sulfonic acid group, and an epoxy group (including a glycidyl group), (flexural modulus: 2,000 MPa, melt flow rate (240° C., 2.16 kg): 30 g/10 min) available from Mitsubishi Engineering-Plastics Company.

(3) Molding of Half Shells 100 parts by mass of the polyurethane elastomer shown in Table 6 was dry blended with 4 parts by mass of titanium oxide, and mixed by a twin-screw kneading extruder to prepare a cover composition in the form of pellet. Extrusion was performed in the following conditions: screw diameter=45 mm; screw revolutions=200 rpm; and screw L/D=35. The mixture was heated to a temperature ranging from 150° C. to 230° C. at a die position of the extruder. Compression molding of half shells were performed by, charging one pellet of the cover composition obtained as described above into each of depressed parts of lower molds for molding half shells, and applying pressure to mold half shells. Compression molding was performed at a temperature of 170° C. for 5 minutes under a molding pressure of 2.94 MPa.

TABLE 6

| Cover composition | Parts by mass |
|---|---|
| Elastollan XNY 85A | 100 |
| Titanium oxide | 4 |
| Slab hardness (Shore D) | 32 |

Note on Table 2:
Elastollan XNY 85A: thermoplastic polyurethane elastomer available from BASF Japan Ltd.

(4) Molding of the Cover

The core obtained in (2) was covered with the two half shells obtained in (3) in a concentric manner, and the cover (thickness: 0.5 mm) was molded by compression molding. Compression molding was performed at a temperature of 145° C. for 2 minutes under a molding pressure of 9.8 MPa.

The surface of the obtained golf ball body was subjected to a sandblast treatment, and marking, and then clear paint was applied thereto and dried in an oven at a temperature of 40° C. to obtain a golf ball having a diameter of 42.8 mm and a mass of 45.4 g. The obtained golf ball was evaluated, and results thereof are also shown in Tables 2 to 5.

Golf balls No. 1 to No. 10, No. 12 to No. 15 are the cases that the intermediate layer is formed from an intermediate layer composition comprising, as a resin component, (A) a polyamide copolymer containing (a-1) a polymerized fatty acid, (a-2) sebacic acid and/or azelaic acid, (a-3) a polyamine component as an essential component, and (B) at least one member selected from the group consisting of (b-1) a binary copolymer composed of an olefin and an α,β-unsaturated carboxylic acid having 3 to 8 carbon atoms, (b-2) a metal ion-neutralized product of a binary copolymer composed of an olefin and an α,β-unsaturated carboxylic acid having 3 to 8 carbon atoms, (b-3) a ternary copolymer composed of an olefin, an α,β-unsaturated carboxylic acid having 3 to 8 carbon atoms and an α,β-unsaturated carboxylic acid ester, and (b-4) a metal ion-neutralized product of a ternary copolymer composed of an olefin, an α,β-unsaturated carboxylic acid having 3 to 8 carbon atoms and an α,β-unsaturated carboxylic acid ester. The results showed that all the golf balls travel a great flight distance when hit with a long iron.

The present invention is suitable for the golf ball having an intermediate layer. This application is based on Japanese Patent application No. 2010-232886 filed on Oct. 15, 2010, the contents of which are hereby incorporated by reference.

The invention claimed is:

1. A golf ball comprising a core consisting of a center and at least one intermediate layer covering the center and a cover covering the core, wherein at least one intermediate layer is formed from an intermediate layer composition comprising, as a resin component,
   (A) a polyamide copolymer containing (a-1) a polymerized fatty acid, (a-2) sebacic acid and/or azelaic acid, and (a-3) a polyamine component, and
   (B) (b-2) a metal ion-neutralized product of a binary copolymer composed of an olefin and an α,β-unsaturated carboxylic acid having 3 to 8 carbon atoms, and (b-4) a metal ion-neutralized product of a ternary copolymer composed of an olefin, an α,β-unsaturated carboxylic acid having 3 to 8 carbon atoms and an α,β-unsaturated carboxylic acid ester,
   wherein (b-2) the metal ion-neutralized product of the binary copolymer composed of the olefin and the α,β-unsaturated carboxylic acid having 3 to 8 carbon atoms is a mixture of a binary ionomer resin neutralized with a sodium ion and a binary ionomer resin neutralized with a zinc ion, and the intermediate layer composition has a melt flow rate (240° C., 2.16 kg) of 35 g/10 min or more.

2. The golf ball according to claim 1, wherein the intermediate layer composition comprises, as a resin component, (A) component in a content ranging from 10 mass % to 80 mass %, and (B) component in a content ranging from 20 mass % to 90 mass % so that a total content of (A) component and (B) component becomes 100 mass %.

3. The golf ball according to claim 1, wherein the intermediate layer composition has a flexural modulus ranging from 350 MPa to 1,000 MPa.

4. The golf ball according to claim 1, wherein the intermediate layer composition has a slab hardness ranging from 66 to 75 in Shore D hardness.

5. The golf ball according to claim 1, wherein the intermediate layer has a thickness ranging from 0.5 mm to 1.5 mm.

6. The golf ball according to claim 1, wherein a mass ratio (a-1)/(a-2) of (a-1) component to (a-2) component ranges from 0.25 to 5.2.

7. The golf ball according to claim 1, wherein (A) the polyamide copolymer has a melt viscosity ranging from 5 Pa·s to 500 Pa·s.

8. The golf ball according to claim 1, wherein (A) the polyamide copolymer has a melt flow rate (230° C., 2.16 kg) ranging from 10 g/10 min. to 2,000 g/10 min.

9. The golf ball according to claim 1, wherein (A) the polyamide copolymer has a flexural modulus ranging from 400 MPa to 1,000 MPa.

10. A golf ball comprising a core consisting of a center and at least one intermediate layer covering the center and a cover covering the core, wherein at least one intermediate layer is formed from an intermediate layer composition comprising, as a resin component,
    (A) a polyamide copolymer containing (a-1) a polymerized fatty acid, (a-2) sebacic acid and/or azelaic acid, and (a-3) a polyamine component,
    (B) (b-2) a metal ion-neutralized product of a binary copolymer composed of an olefin and an α,β-unsaturated carboxylic acid having 3 to 8 carbon atoms, and (b-4) a metal ion-neutralized product of a ternary copolymer composed of an olefin, an α,β-unsaturated carboxylic acid having 3 to 8 carbon atoms and an α,β-unsaturated carboxylic acid ester, and
    (C) a polyamide resin composition comprising (c-1) a polyamide resin not containing (a-1) the polymerized fatty acid and (c-2) a resin having at least one functional group selected from the group consisting of a hydroxyl group, a carboxyl group, an anhydride group, a sulfonic acid group, and an epoxy group,
    wherein the intermediate layer composition comprises component (A) in a content ranging from 1 mass % to 70 mass %, component (B) in a content ranging from 15 mass % to 65 mass %, and component (C) in a content ranging from 15 mass % to 60 mass %, with the total content of components (A), (B), and (C) being 100 mass %, and
    wherein the intermediate composition has a melt flow rate (240° C., 2.16 kg) of 35 g/10 min or more.

11. The golf ball according to claim 10, wherein the intermediate layer composition comprises, as (b-2) the metal ion-neutralized product of the binary copolymer composed of the olefin and the α,β-unsaturated carboxylic acid having 3 to 8 carbon atoms, a mixture of a binary ionomer resin neutralized with a sodium ion and a binary ionomer resin neutralized with a zinc ion.

12. The golf ball according to claim 10, wherein the intermediate layer composition has a flexural modulus ranging from 350 MPa to 1,000 MPa.

13. The golf ball according to claim 10, wherein the intermediate layer composition has a slab hardness ranging from 66 to 75 in Shore D hardness.

14. The golf ball according to claim 10, wherein the intermediate layer has a thickness ranging from 0.5 mm to 1.5 mm.

15. The golf ball according to claim 10, wherein a mass ratio (a-1)/(a-2) of (a-1) component to (a-2) component ranges from 0.25 to 5.2.

16. The golf ball according to claim 10, wherein (A) the polyamide copolymer has a melt viscosity ranging from 5 Pa·s to 500 Pa·s.

17. The golf ball according to claim 10, wherein (A) the polyamide copolymer has a melt flow rate (230° C., 2.16 kg) ranging from 10 g/10 min. to 2,000 g/10 min.

18. The golf ball according to claim 10, wherein (A) the polyamide copolymer has a flexural modulus ranging from 400 MPa to 1,000 MPa.

* * * * *